US012804364B2

(12) United States Patent
Kling et al.

(10) Patent No.: US 12,804,364 B2
(45) Date of Patent: Nov. 17, 2026

(54) METHODS AND SYSTEMS FOR IMPLEMENTING AND USING EDGE ARTIFICIAL INTELLIGENCE (AI) SENSOR COLLABORATIVE FUSION

(71) Applicant: MatrixSpace, Inc., Burlington, MA (US)

(72) Inventors: Matthew T. Kling, Uxbridge, MA (US); Nihar Nanda, Burlington, MA (US)

(73) Assignee: MatrixSpace, Inc., Burlington, MA (US)

( * ) Notice: Subject to any disclaimer, the term of this patent is extended or adjusted under 35 U.S.C. 154(b) by 425 days.

(21) Appl. No.: 18/545,768

(22) Filed: Dec. 19, 2023

(65) Prior Publication Data

US 2024/0205651 A1 Jun. 20, 2024

Related U.S. Application Data

(60) Provisional application No. 63/433,612, filed on Dec. 19, 2022.

(51) Int. Cl.

| | |
|---|---|
| ***H04W 4/38*** | (2018.01) |
| ***H04W 28/02*** | (2009.01) |
| *H04W 84/18* | (2009.01) |
| *H04W 88/16* | (2009.01) |

(52) U.S. Cl.

CPC ......... *H04W 4/38* (2018.02); *H04W 28/0236* (2013.01); *H04W 84/18* (2013.01); *H04W 88/16* (2013.01)

(58) Field of Classification Search

CPC ....... H04W 84/12; H04W 4/80; H04W 40/02; H04W 88/08; H04W 12/08; H04W 12/65; H04W 12/79; H04W 4/33; H04W 4/023; H04W 88/16; H04W 4/00; H04W 4/38; H04W 52/00; H04W 52/42; H04W 72/046

USPC .......................................................... 455/500

See application file for complete search history.

(56) References Cited

U.S. PATENT DOCUMENTS

| | | | | |
|---|---|---|---|---|
| 2019/0287376 A1* | 9/2019 | Netscher | ............... | G06F 40/169 |
| 2019/0356508 A1* | 11/2019 | Trikha | ...................... | E06B 7/28 |
| 2020/0357268 A1* | 11/2020 | Tyson | .................... | G08B 17/00 |
| 2024/0356598 A1* | 10/2024 | Li | .......................... | G01S 19/45 |
| 2025/0178970 A1* | 6/2025 | Dukes | ..................... | C04B 35/56 |

* cited by examiner

*Primary Examiner* — Ajibola A Akinyemi

(74) *Attorney, Agent, or Firm* — Ryan, Mason & Lewis, LLP

(57) ABSTRACT

Systems and methods are provided for implementing and using edge artificial intelligence (AI) sensor collaborative fusion. An edge sensor unit may be configured for operating in a communication network, and may include a plurality of sensor devices configured for obtaining sensory data, processing circuits configured for one or both of controlling and processing of data, and a communication module including communication circuits configured to facilitate or support local communication with other nodes in the communication network. The edge sensor unit may be configured to communicate with one or both of at least one other edge sensor unit or a sensor gateway node that is configured to provide connectivity to edge sensor units in the communication network. The processing circuits may be configured to perform or support fusing of sensory data obtained by the edge sensor unit and at least one other edge sensor unit in the communication network.

36 Claims, 8 Drawing Sheets

METHODS AND SYSTEMS FOR IMPLEMENTING AND USING EDGE ARTIFICIAL INTELLIGENCE (AI) SENSOR COLLABORATIVE FUSION

CLAIM OF PRIORITY

This patent application makes reference to, claims priority to, and claims benefit from U.S. Provisional Patent Application No. 63/433,612, filed on Dec. 19, 2022. The above identified applications is incorporated herein by reference in its entirety.

TECHNICAL FIELD

Aspects of the present disclosure relate to communication solutions. More specifically, various implementations of the present disclosure relate to methods and systems for implementing and using edge artificial intelligence (AI) sensor collaborative fusion.

BACKGROUND

Operation of a radio frequency (RF) communication network in a dynamic, and sometimes hostile, RF environment poses many challenges, especially if the nodes in the network are highly mobile and the RF environment is rapidly changing. Each node is subject to interference, and the longer the distance to be covered, the more susceptible nodes are to interfering signals while power and antenna requirements increase.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for implementing and using edge artificial intelligence (AI) sensor collaborative fusion, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
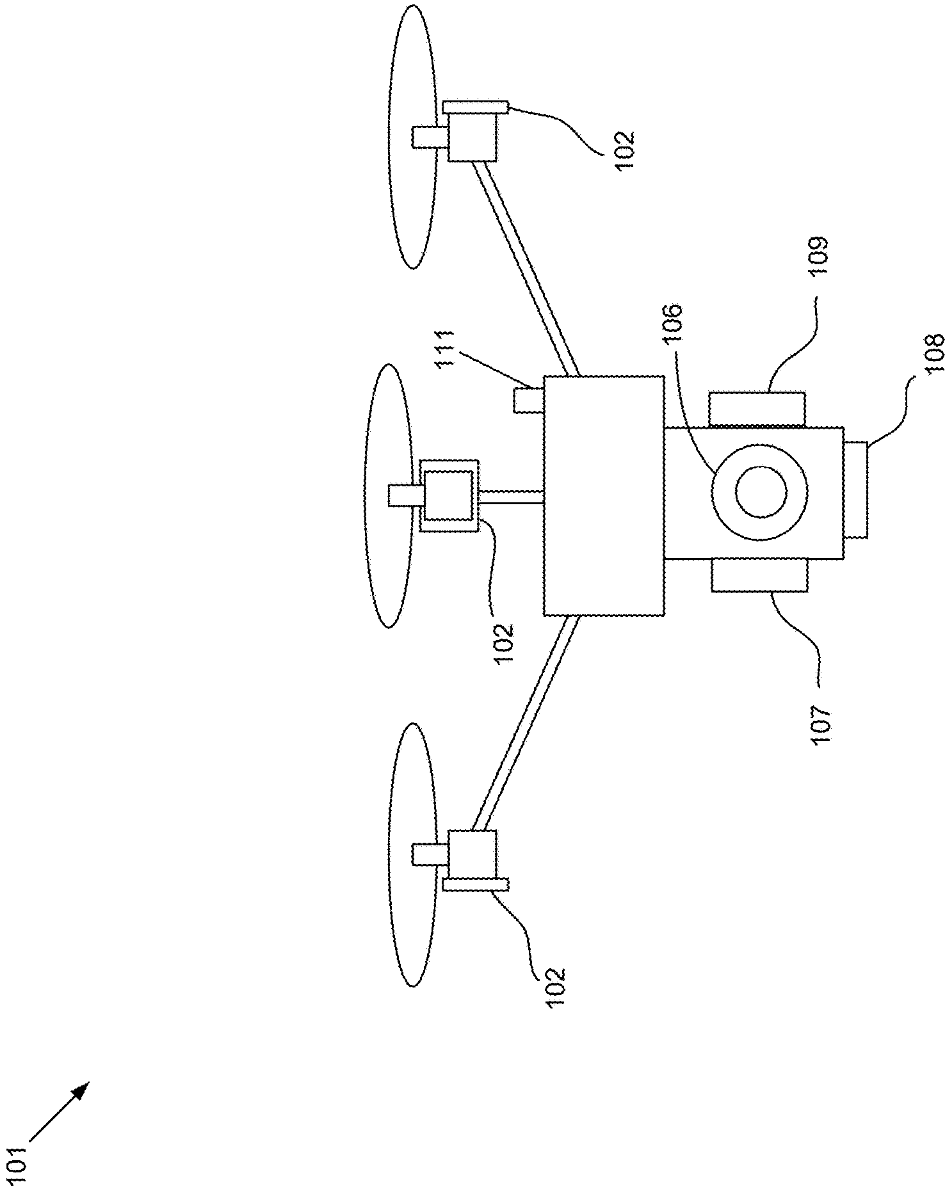
FIG. 1 shows an aerial drone that may be utilized in accordance with an example embodiment of the disclosure.

Communications networks involve tradeoffs in range, bandwidth, power, and noise immunity. A mesh network is a form of network where the distance covered can be extended by hopping communications through intermediate nodes. Instead of hopping along a single path, a mesh topology allows a communication link to be set up on any of multiple paths through the mesh. A mesh routing protocol allows a link to be set up between any two nodes over any available path through the mesh. If a link is broken because of interference or loss of a node, the protocol establishes a new route through the mesh. Accordingly, a mesh network is resilient and self-healing.

Existing mesh network implementations use nodes that are largely static or operate with omnidirectional antennas, and operate at relatively lower frequencies. The present disclosure contemplates a mesh network of fixed or highly mobile nodes, with a preferred embodiment that operates as a swarm of aerial nodes, where the mesh may choose paths that reject interference based on directional properties of the node antennas and their transmission and reception. In addition, the network is implemented with millimeter (mm) wave radios. Millimeter wave is high frequency, high-bandwidth, and thus offers higher data rates, than WiFi bands. The mm wave spectrum is also less crowded with competing applications, especially above the highest frequency cellular bands. Another advantage of mm wave is that antenna size decreases with increasing frequency, allowing for more sophisticated, higher gain antennas in smaller, lighter weight packages. Phased array antennas allow for increased gain, and in particular, by adjusting the phase and amplitude of each element in the array, the antenna gain can be adjusted and steered so that the antenna is highly directional and rapidly adjustable, an important feature for the highly dynamic nature of the disclosed mesh network.

In a mesh network of nodes with omnidirectional antennas, an interfering RF emitter will continue to interfere with nearby nodes no matter how the node is oriented relative to the interferer. Even if the node is mobile, changing the orientation of the node or minor adjustments in location are unlikely to alleviate the interference. However, by using a mesh network with directional antennas, such as phased array antennas, for example, nodes that are being interfered with may steer their antennas' beam patterns towards a node that is in a direction with less interference, use or select a different route through the mesh network that uses nodes whose antenna orientation is not aligned with the source of interference, and/or adjust the beam pattern so that a notch or null in the beam pattern is aimed at the interferer while only losing a slight amount of gain relative to peak gain. Nearby nodes that are within range of the interferer may also make these adjustments to their beam pattern as well. This may be done at high speed, with physically moving the node in space maintained as another option.

FIG. 1 shows an aerial drone that may be utilized in an accordance with an example embodiment of the disclosure. Shown in FIG. 1 is drone 101. The drone 101 is not crewed, and is preferably lightweight with a useful payload on the order of 10 pounds. The drone is equipped with directional, planar phased array antennas 102. While FIG. 1 only has three motor/blade mechanisms visible, there is a fourth directly behind the front one, although a higher number may be utilized, such as six, eight, or twelve for example. The phased array antennas 102 can be mounted on any convenient surface on the drone to achieve the desired coverage based on the capability of the array, as further explained herein.

The drone is also equipped with sensors for collecting information. In the embodiment shown, the sensors include an optical imager 106, an infrared sensor 107, a LIDAR imager 108, an acoustic sensor 109, radar, and software-defined radio (SDR) for RF spectral sensing. The drone may comprise additional hardware for guidance, including a satellite position system antenna 111 and an inertial "dead reckoning" accelerometer and magnetic compass (not shown). The phased array antennas may be of any size, but are shown as 4×4 arrays in this embodiment, with an element size designed for the millimeter wave range, generally in the range of 10 to 200 GHZ. While any operating frequency could be chosen, the preferred embodiment operates at 24 GHz. In this mode of operation, line of sight communication of the radio links described herein is reasonable out to a single digit mile radius, with link distances typically under one mile.

Altitude is an important parameter for locating the drone in space, and essential for avoiding terrain. The drone preferably employs a combination of techniques for determining and maintaining altitude. Laser range finding, such as LIDAR, provides fast and accurate altitude information provided visibility is good. An on-board pressure altimeter provides a secondary reference, and the phased array antennas 102 may be used to provide ranging information to points on the ground using trigonometry if the ground surface is sufficiently reflective. Satellite provided Global Positioning System (GPS) or the like may also provide an estimate of altitude above the surface of the earth. Combining all these sources and comparing them to an on board reference map of the area of operation provides an accurate assessment of current altitude and contributes to a refined assessment of the drone's absolute position in space, further described below.

Figure 2:
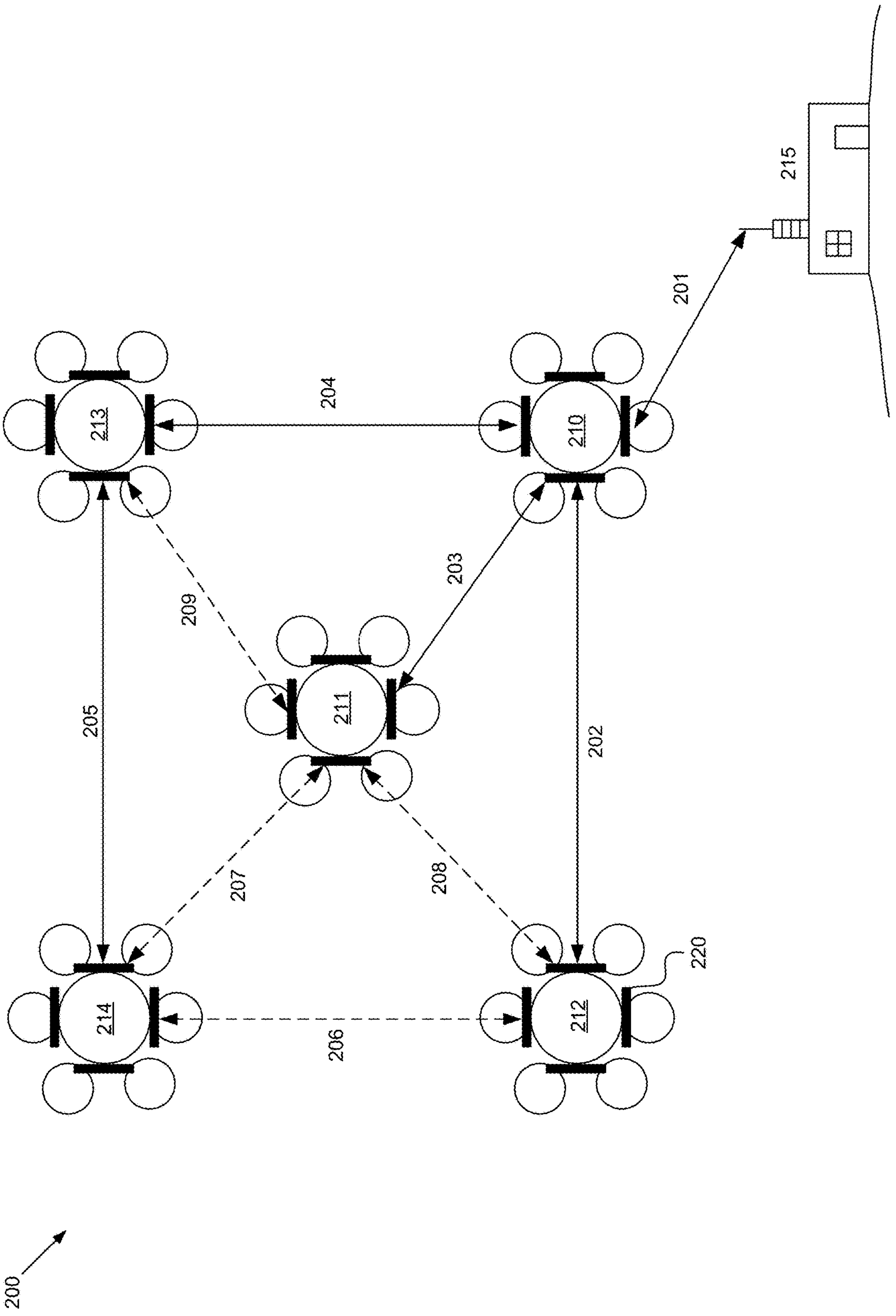
FIG. 2 shows a drone swarm that has formed a mesh network.

FIG. 2 shows a network 200 of aerial drones 210-214 forming a mesh network of links 201-209. Each of the drones 210-214 may comprise one or more phased array antennas 220, where the number of antenna arrays may ensure full 360° coverage. The network has a root at a ground or base station 215, which is shown as a static location but could also itself, be mobile. Dashed line links 206-209 represent alternate links between drones that are not active. Each drone acts as node in the network. It is not required that all nodes operate at the same frequency, and to avoid interference between nodes that are lined up such that a third further node is in the peak energy beam of a radio link between a first and second node, the network may employ several alternate neighboring frequencies.

Illustrated in FIG. 2 is a drone swarm of unmanned aerial drones. Each drone in the swarm is also a communications node and is equipped with one or more phased array, electrically steerable antennas and a transceiver operating in the millimeter wave region. Each drone may also be equipped with one or more sensors, such as optical, LIDAR, thermal, or acoustic sensors. The drones carry an on-board processor and memory for controlling the drone's movements, operating the sensors, and managing the transceiver. The drones also carry antennas and a processor for determining position based on satellite data (e.g., Global Positioning System (GPS) or the like) and optionally an on-board inertial and magnetic (compass) sensor. The drones communicate with each other to form a mesh network of communication nodes with an RF link back to a root node, base station, or other target node in the network. The nodes respond to interference from jammers and obstacles by finding new paths through the mesh, steering the millimeter wave beam, re-positioning, or a combination of these techniques.

Path loss of a radio link increases proportional to the square of frequency. For example, going from 2.4 GHz which is roughly a common frequency for cell phones and 2.4 GHz WiFi to 24 GHz would result in a path loss that is 100 times higher, or 20 dB. Going from 2.4 GHz to 80 GHz would have a 30 dB increase in path loss. In a free space propagation condition, the path loss increases by 20 dB for every decade of distance. Therefore, going from 2.4 GHz to 24 GHz would reduce the link distance by a factor of 10, and the link distance for an 80 GHz link would decrease by a factor of 33. However, high frequencies have the benefit of very wide bandwidths and thus faster data rates. Additionally, the size of the antenna decreases with frequency (wavelength), enabling the use of more complex, higher gain antennae to combat the increase in path loss. Higher gain results from focusing the energy, thereby resulting in highly directional antennas.

The phased array antenna consists of numerous antenna that have their amplitude and phase adjusted to steer the beam by adjusting summation and cancellation of signals from various directions. The focusing of the energy, often in both azimuth and elevation, creates a higher gain antenna. However, the very focused beam is preferably pointed in the right direction to facilitate communication. Additionally, the focusing of the beam means the transmission/reception in directions away from the main beam is attenuated, which may enable the avoidance of interference.

Furthermore, the phased antenna arrays may help with isolation of communication channels such as transmitting in one direction and receiving in another. Phased array antennae utilize software to control the gain/phase of each antenna element for steering of the beam, where the system is aware of which direction to steer the beam. The beams may be steered by knowledge of relative GPS locations or drone formation which may be known based on a flight plan or shared over a communications link. The beams may also be steered by scanning the beam and/or with closed-loop tracking. One typical implementation of a phased array antenna uses a planar array of patch antenna elements. This has the advantage of being flat and thus can fit well onto an aircraft without significant size and aerodynamic implications.

Figure 3:
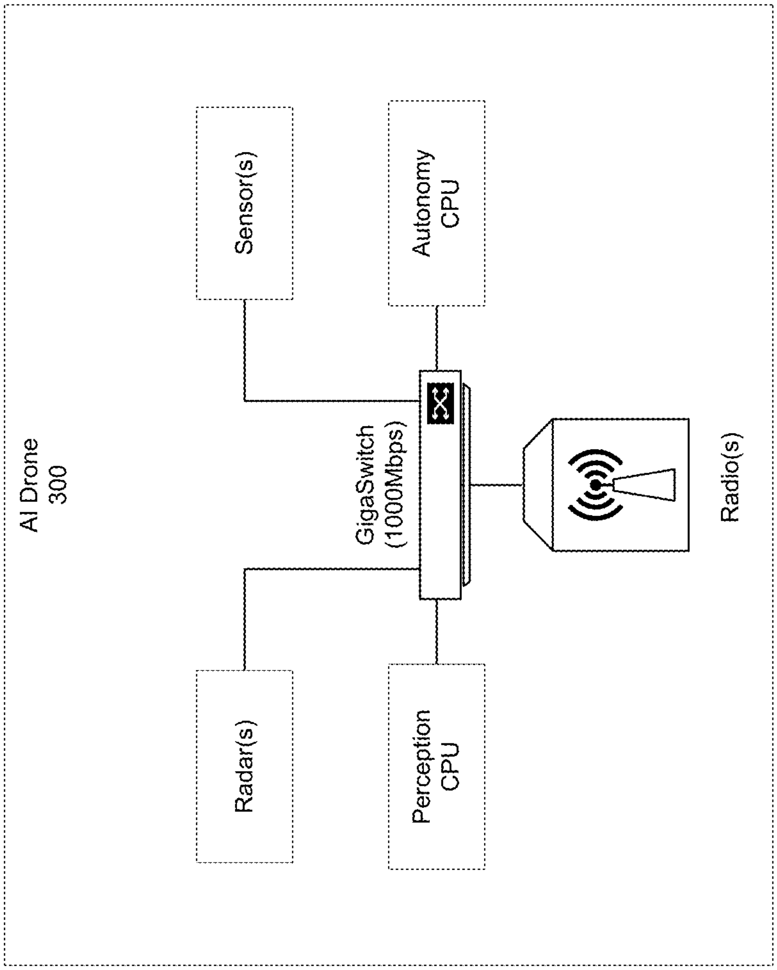
FIG. 3 shows an example artificial intelligence (AI) drone that may be utilized in accordance with an example embodiment of the disclosure.

FIG. 3 shows an example drone that may be configured for improving radar angular resolution in accordance with an example embodiment of the disclosure. Shown in FIG. 3 is an aerial drone 300 (as described herein).

The drone 300 may comprise suitable circuitry and other components (e.g., hardware or otherwise) to facilitate operation in accordance with the present disclosure. For example, the drone 300 may comprise radar(s), other sensor(s), communication module(s), and processors (e.g., central processing unit (CPU) processors, graphics processing unit (GPU) processors, etc.). In some instances, the drone 300 may be configured to facilitate or support use of advanced computing/processing based operations, such as artificial intelligence (AI) based operations. In this regard, circuitry and other components (e.g., hardware or otherwise) embedded in (or otherwise made available to) the drone 300 may be configured to support various advanced computing based tasks, such as real-time artificial intelligence (AI) computing/processing and data analytics, which may be used in conjunction with radar angular resolution related functions.

For example, as shown in FIG. 3, the drone 300 comprises a perception processor/circuit (or CPU), an autonomy processor/circuit (or CPU), radio(s), radar(s) and other sensor(s) for obtaining sensory related data, and a switch for facilitating interactions among the various elements of the drone 300. The perception processor/circuit (or CPU) and the autonomy processor/circuit may be configured to facilitate and support, inter alia, AI based sensing, data fusing, and data sharing functions, as described herein. The radio(s) may be configured for supporting communications by the drone 300, such as, e.g., with other AI drones and/or other network elements within a mesh network comprising the drone 300. The disclosure is not limited to particular type of radios, and various types may be used so long as suitable for operation in drone-based environment. In an example implementation, mesh based radios that may be optimized for supporting forming and operating mesh networks of drones are used. The radars may be configured to provide radar based detection, using known radar detection technique. The sensors may be configured to obtain sensory data that may augment radar based data. The sensors may be configured to support, e.g., automatic dependent surveillance-broadcast (ADS-B) based sensory, camera feed, thermal imaging, etc.

In some instances, drones such as the drone 300 may be configured for improved data communications in drone based mesh networks. As noted, the drone 300 may incorporate advanced radios, illustratively radar/communication module(s), such as mesh based radios, which may support improved data communication. For example, the radar/communication module(s) may support high-speed long-range data (e.g., >200 Mbps up to 1 km), may have large field of view (e.g., 120° in azimuth and elevation). The radar/communication module(s) may support use of secure data link(s) (e.g., with AES-256 encryption).

In some instances, drones such as the drone 300 may be configured to provide and/or support use of local high bandwidth mesh to enable the drone to connect to other drones and/or network devices. Such local mesh may allow for connecting to drones, fixed sites (e.g., sensor(s) with radios), police cruiser, sensors, etc. For example, mesh connectivity may be provided using 24 GHz phased array, which may allow for communication at, for example, 400 Mbps at 600 m, 200 Mbps at 1 km, and/or 2 Mbps at 20 km. Local device connectivity may be provided using 802.11n dual band, which may allow up to 10 WiFi users (e.g., at 433 Mbps), and/or via wired Ethernet for expanded users. Such mesh connectivity may be suitable for various use applications, such as distributed sensor networks, sensor fusion applications, etc.

In some instances, drones such as the drone 300 may be configured to form and/or operate within a sensor mesh. In such instances, some of the drones may comprise high performance embedded CPU and GPU processor(s) for use in data processing, particularly in conjunction with handling processing and fusing gathered sensory data.

In some instances, drones such as the drone 300 may be configured to support various advanced computing based tasks, such as real-time artificial intelligence (AI) and data analytics, which may be used in conjunction with radar angular resolution related functions. In this regard, the drone 300 may be configured to provide software defined artificial intelligence (AI) sensing and autonomous responses. This may be particularly possible and/or optimized in conjunction with the radar angular resolution related functions. In this regard, such AI based solution may include and/or entails use of AI sensing, AI autonomy, and AI cloud services. With respect to AI sensing, data acquisition may be performed using advanced (e.g., mesh based) radars/radios. In this regard, formed RF meshes may enable new levels of data sharing for distributed sensing. Such radars may be optimized for drones or handheld devices. AI software may fuse optical and radar (data), such as using AI deep learning. The software may integrate data from 3rd party optical, LIDAR, thermal/IR and other sources as needed. Sensors may be handheld, ground based, and/or deployed on drones. The implementation of the disclosed software and/or sensing enables multiple object classification & tracking, even in foggy or smoky conditions.

Artificial intelligence (AI) Autonomy may be utilized when acting on acquired data. Sensors, people, vehicles and drones may coordinate data in real-time through RF mesh network. Autonomy software may be used to enable and ensure autonomous drone response and provide AI based assistance to operators. This may allow for multiple object classification and tracking, even in low visibility (e.g., foggy or smoky) conditions. Automated drones may extend sensing over distance and rapidly inspect areas of interest. This may allow for intelligent detect and avoid, or detect and track navigation. In some instances, sensor data may be rendered into detailed three-dimensional (3D) models (e.g., terrain, structures, areas of interest, etc.). The use of such service may also allow for detecting safety hazards (e.g., in structures, terrain, certain locations, etc.), and/or detecting safety/security issues. In some instances, open architecture may be used/supported to enable running or incorporate applications from different sources (e.g., combining provider's proprietary neural networks with user's and/or 3rd party's AI applications).

In some instances, drones such as the drone 300 may be configured for operation within network arrangements configured for other advanced and/or specialized services, such as, e.g., enabling enterprises-scale deployment of aerial vehicles, ground vehicles, fixed sensors, and more, interoperating with any existing networks using intelligent routing at the edge, and/or securing data from end-to-end using fully encrypted links (AES-256).

In accordance with the present disclosure, networks comprising drones such as the drone 300 may be configured for supporting improved radar angular resolution and overall target location ability. Overall target location ability may be improved by, e.g., fusing of radar based data with other sources (e.g., optical or the like). The improvement related measures or techniques may be implemented via a single platform or multiple platforms. In this regard, single platform based improvement may comprise one or more of: moving the platform for multiple observations, use of use of autonomous movement, use of advanced/optimized processing (e.g., artificial intelligence (AI) based processing), classifying objects (e.g., for optimized detection), sharing of information with other nodes (e.g., other drones, other nodes, ground stations, the cloud, etc.), sharing of information within a mesh (comprising plurality of similar platforms), and the like. When moving the platform for multiple observations, information such as location, heading, beam, etc. may be obtained and/or recorded for each observation point. In this regard, location and heading information may be obtained using suitable sensory techniques, such as global positioning (e.g., GPS), inertial measurement unit (IMU) based sensing, and the like.

Multiple platforms based improvement may be implemented via a plurality of platforms (e.g., combination of one or more of drones, non-drone mobile nodes, fixed nodes, etc.). In this regard, in some instances the single platform based improvement techniques as described herein may be applied at one or more of the multiple platforms utilized for multiple platforms based improvement. Further, multiple platforms based improvement may comprise one or more of: simultaneous or near simultaneous use of at least some of the multiple platforms, autonomous control of at least some of the multiple platforms, coordinated operation of other platforms, flying drones in formation, moving drones for improved location ability, use of passive detection, use of active and/or passive detection from drone to drone.

The simultaneous or near simultaneous use of platforms may comprise and/or entail coordinating (and thus sharing information relating to) such operation parameters as frequency, time, code, space related parameters, or combinations thereof. Passive detection may comprise (or entail) utilizing coded chirps, and entail selecting or setting such parameters as frequency and time related parameters. Coordinated operation of other platforms may comprise, for example, having one node alerting one or more other nodes to request observation and/or coordination of actions by the one or more other nodes. This may comprise or entail sharing or coordinating such information as location(s), target, beam steering, etc. Implementations incorporating use of the improved radar angular resolution and overall target location ability as described herein may have various practical applications—e.g., in drone navigation/detection, in security solutions, in ground based perimeter, in ground vehicle based solutions, in aviation based solutions, in marine based solutions, in golfing and other sports, in local air traffic solutions. Use of such measures or techniques in improving radar angular resolution, and example use cases based thereon, are described in more detail below.

In accordance with the present disclosure, enhanced sensing solutions are provided, incorporating multi-modal sensor based systems and/or networks that are configured for supporting improved sensing in combination with edge extending, data sharing, and collaborative fusion of sensing data. In this regard, as used herein "multi-modal sensor" or "multi-modal sensing" (also referred to herein as "multi-sensor systems" and/or "multi-sensor networks") refers to use of multiple sensors (including sensing integrating different types of sensors), to extend coverage and/or allow for enhanced sensing (e.g., by use of different types of sensors, different sensing perspectives, etc.), and/or use of sensory data obtained thereby (or information generated or obtained based thereon), particularly where the sensory data is fused in real-time or near real-time, and/or where the data fusing may be done in collaborative manner and/or using advanced processing techniques, such as artificial intelligence (AI) processing. The amount time or scale of timeliness that may be construed as constituting real-time or near real-time may vary based on the application. In this regard, actual real-time may be difficult with AI technologies available nowadays, and as such fusing of data may only be possible in near-real-time. For example, milliseconds may be considered real-time in some systems or some applications, whereas for other systems or applications (e.g., radars synchronization) real-time may have scale in the nanoseconds.

Solutions based on the present disclosure may address various issues and/or limitations in existing and/or conventional solutions. In this regard, one commonly used type of sensors is optical sensors, such as cameras, which may be used to detect and track objects on the ground or in the air for security and surveillance (e.g., monitoring). Cameras may be used in security and surveillance where a centralized or cloud server is used to collect all data, with operators monitor sensor streams to recognize when something of interest is taking place. However, use of cameras may have shortcomings, as use of cameras may be challenging with low light, under certain conditions (e.g., smoke or fog), and the like. Further, camera based solutions lack support for sensor fusion, and offer limited object recognition and tracking. Another commonly used type of sensors is radar, which may be used to, e.g., detect and track objects, such as objects on the ground for vehicle navigation, in the air for airspace monitoring, etc. For example, automotive radars may be used for short range object detection and collision avoidance or driver assistance, and airspace radars may be used for, e.g., air traffic monitoring, and military/defense applications, etc. However, use of radars may have shortcomings, as typically only single radar is used (per platform), radars may not be integrated with other sensors, and radars may be large and expensive and as such may not be compatible with small platforms. Another commonly used type of sensors is radio frequency detectors, which may be used to identify remote datalink waveform signatures. Such systems may estimate direction of arrival of signals with high amounts of error and use other sensors like optical sensors to obtain better, and/or to provide estimates of target location after initial detection. However, use of radio frequency detectors alone may have shortcomings, such as due to inadequate object recognition and inaccurate three-dimensional (3D) position estimation.

Conventional sensing may have various limitations and/or issues. For example, use of sensors, such as for security and surveillance of physical spaces (ground or air), may have severe constraints for accurate detection and tracking of objects, particularly when utilizing a single sensor type. For example, many optical security systems rely on a human to recognize objects, and do not perform well in low light conditions. Additionally, conventional sensor networks simply pass large volumes of data to a central server without coordination across distributed fields of view and without sensor fusion to fill in gaps or enhance vision. Also, running power or data cables to widely distributed sensors is cumbersome, time-consuming, expensive, and limits scalability of the sensor network to grow and adapt to changing needs. Conventional solutions do not leverage various advancements, such as evolving sensor technologies, high-end edge computing, and AI processing (e.g., for object recognition).

Solutions based on the present disclosure may allow for leveraging such advancements, however, which may produce better results, particularly when combining multiple sensors and multiple sensor types at the edge. In this regard, current sensing solutions may be limited in performance in terms of both accuracy and coverage range. Networked, AI-enabled multi-modal sensing with multiple types of sensors (e.g., radar and optical) offers large performance gains in accuracy by sharing fields of view and combining data as well as increases in coverage area by sharing and handing off object tracking, similar to handoffs in a cellular network. Solutions based on the present disclosure may offer other improvements over existing solutions. For example, current solutions require complex installation procedures for sensor placement, providing power, and enabling communications. Security cameras, e.g., may operate using Power over Ethernet (PoE), which requires individual cables to be run and have length limitations in 100's of meters. This also limits coverage areas and deployment locations or drastically increases complexity and cost for deployment. Further, cameras may not perform well at night or in low lighting conditions and cannot see through smoke or fog. Single radar sensors do not provide good visibility. Also, radar sensors may be limited to high-end military solutions and are not Size, Weight, Power and Cost (SWaP-C) compatible with portable/mobile platforms. Sensors do not easily integrate with each other, meaning large investments in engineering costs are required. For example, combining sensors of different types requires highly specialized skillsets and knowledge.

In various example implementations based on the present disclosure, a single integrated sensor device (or sensor unit) may be used at the edge, which combines use of one or more types of sensing (e.g., advanced radar sensing and optical cameras), with use of advanced processing (e.g., AI based processing) and communications capabilities to enable real-time situational awareness observing target and movements. The single integrated sensor devices may be capable of synchronizing sensor observations and of processing accurately sensory data, in timely manner (e.g., up to milliseconds), and of generating fully coordinated sensor object detection and tracking with high degree of precision. Radar and optical sensors present in the sensor unit share a similar field of vision enabling detection and tracking accuracies with extending the range over multiple kilometers. Embedded geo-position and orientation system in the sensor unit may be used to provide accurate location and heading of the sensor unit compensating for object detection locations in real-time expanding applicability in moving and static sensor units.

The sensor units may be configured to work collaboratively in conjunction with one or more sensor gateways, forming collaborative network of multi-modal sensors, which may be used to provide access to and/or among the sensor units, and/or to support collaborative sharing and fusing of sensory data. In this regard, the sensor units may be equipped with wireless communication resources, to enable communication over secure private sensor networks set up and/or managed via the sensor gateways to enable distributing or sharing detection and tracking data (e.g., of flying or ground-based targets). The sensor gateways may be configured to fuse individual sensor device feeds, such as into shared field of vision data, generating situational awareness of tracked targets over a large area. Advanced processing techniques, such as AI processing, may be used, such as in object recognition and/or in analyzing object movement within the area, identifying individual targets, identifying possibility of threats in cases of security and surveillance applications.

The sensor units with a sensor gateway may form a self-sustainable distributed single or multi-sensor system or network comprising sensors, computing resources, storage resources, and communication resources, which may be ready to be deployed for any edge application with minimal requirements creating advanced situational awareness. Such single or multi-sensor system or network may have a wide range of edge applications that may include military and defense, physical security, airspace security, airspace management, autonomous vehicles, as well as others such as sports analytics. In some instances, multiple sensor gateways may be connected (e.g., over wireless connections) within the same network, allowing for scaling of edge sensing operation over vast areas creating object tracking and threat detection.

Accordingly, example implementations based on the present disclosure may incorporate one or more of such features as: 1) combined optical sensing and mmWave radar sensing extending area of coverage, allowing operations over any lighting (day, night, bright sunshine), weather conditions (rain, fog, snow) and environmental conditions (smoke, dust); 2) improved accuracies of object detection and classification with probabilistic AI object detection and 3d positioning; 3) real-time sensor fusion and combined object tracking with timing synchronization; 4) integrated private sensor network, sensor units communicate with latency and reliability; 5) options for both sub-6 GHz communications and 24 GHz communications; 6) network edge extension with mm-wave beam steering; 7) GPU and multi-core CPU Edge Compute; 8) embedded GPS for real-time position; 9) embedded INS for accurate position, pose, and motion information; 10) phase locked (e.g., GPSDO) frequency and time source for synchronization; 11) flexible power sources for wide range of deployments (e.g., DC input, AC input, solar input, optional battery, etc.); 12) advanced design with choice of materials for enclosures and electronic components top operate outdoors in adverse conditions. Example implementations, and/or features associated therewith, based on the present disclosure are illustrated in, and described in more detail below with respect to FIGS. 4 to 8.

Figure 4:
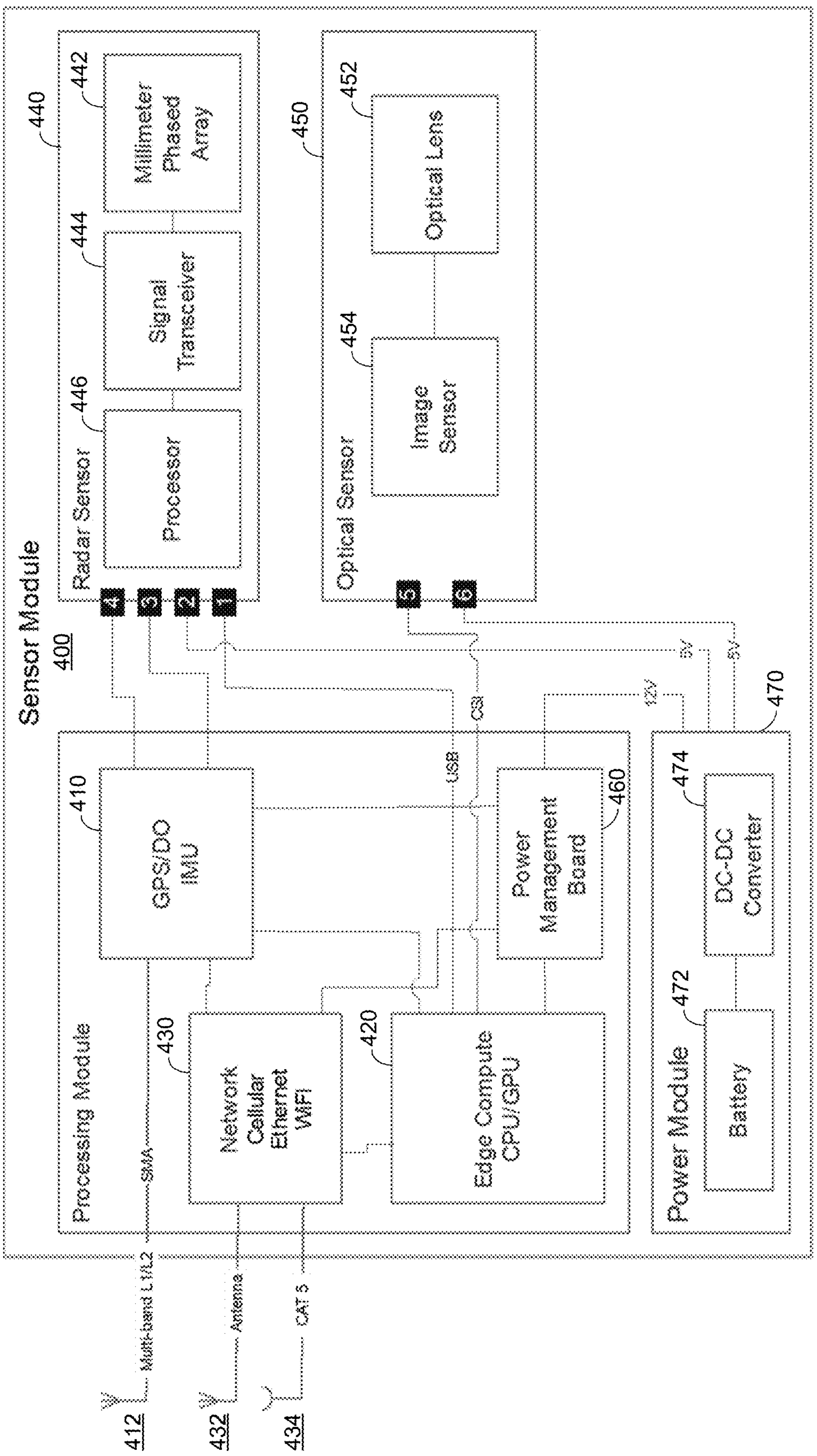
FIG. 4 illustrates an example sensor module, in accordance with the present disclosure.

FIG. 4 illustrates an example sensor module, in accordance with the present disclosure. Shown in FIG. 4 is sensor module 400. The sensor module 400 may comprise suitable circuitry and other hardware resources for providing edge sensing functions, along with additional functions (e.g., communication, processing, etc.), and may be particularly adapted for use in mesh networking based implementations in accordance with the present disclosure.

In the example embodiment illustrated in FIG. 4, the sensor module 400 comprises a global positioning system (GPS)/disciplined oscillator (GPS/DO) unit 410, edge compute CPU/GPU 420, a network board 430, a radar sensor 440, an optical sensor 450, power management board 460, and a power module 470. Each of these elements may comprise suitable circuitry for performing functions or operation associated therewith.

The GPS/DO unit 410 may comprise circuitry for a combination of a GPS receiver and a high-quality/stable oscillator for providing accurate clocking during GPS reception related functions. The GPS/DO unit 410 may be configured to drive one or more antennas 412 for use in receiving GPS (or any suitable global positioning system) signals. For example, the antennas 412 may be configured for multi-band L1/L2 based reception. Nonetheless, the disclosure is not limited to use of GPS, and as such any suitable global navigation satellite system (GNSS) may be used.

In some instances, the GPS/DO unit 410 may also be configured (e.g., by incorporating or otherwise configuring existing suitable circuitry) for providing on-board inertial measurements and multi-constellation positioning measurement. For example, the GPS/DO unit 410 comprise a combined on-board inertial measurement sub-unit (IMU) and multi-constellation GNSS positioning sub-unit.

The edge compute CPU/GPU 420 may comprise suitable circuitry for providing processing and related storage functions associated therewith. In this regard, the processing functions may control, data processing (including video/graphics processing, such as video data obtained during sensory/detection operations). The edge compute CPU/GPU 420 may be configured for utilizing advance processing techniques, such as AI processing. For example, the edge compute CPU/GPU 420 may comprise, e.g., suitable circuitry storing AI embedded software for handling AI based processing.

The network board 430 may comprise suitable circuitry for providing networking based communication, including both wireless (e.g., radio frequency (RF)) networking based communication and/or wired networking based communication (e.g., Ethernet). In this regard, the network board 430 may comprise radio integrated circuit (IC), which may be configured to driving one or more antennas 432 for facilitating the radio based communications, such as cellular, WiFi, etc. In some instances, the antennas 432 may be configured for waveform MIMO 2.4 GHz based transmission/reception. The network board 430 may also comprise suitable circuitry for driving wired connector(s) (e.g., Cat5) 434, for facilitating wired based communications, such as, e.g., Ethernet based communications. The network board 430 may be configured to provide and/or support peer-to-peer (P2P) based communications.

The radar sensor 440 may comprise suitable circuitry (and related hardware resources) configured to provide radar detection. For example, the radar sensor 440 may be configured to operate as mmWave based radar. In this regard, the radar sensor 440 may comprise a millimeter phased antenna 442, a signal transceiver 444, and a signal processor 446. Nonetheless, the disclosure is not limited to such approach, and any suitable radar detection technique may be used.

The optical sensor 450 may comprise suitable circuitry (and related hardware resources) configured to provide optical detection. For example, the optical sensor 450 may comprise an optical lens 452 and an image sensor 454.

The power management board 460 may comprise suitable circuitry (and related hardware resources) configured to provide power management functions within the sensor module 400.

The power module 470 may comprise suitable circuitry (and related hardware resources) configured for facilitating and/or supporting providing power to the sensor module 400. For example, the power module 470 may comprise a battery 472 that supplies power to the sensor module 400 for operation. In this regard, the battery 472 may be used in storing charge for supplying to the sensor module 400. The battery 472 may be a rechargeable battery. The power module 470 may further comprise DC-DC converter 474, which may be configured for converting input DC to one or more other DC values. For example, the input DC may be 12V (e.g., where the battery 472 may be a 12V battery), whereas some of the components of the sensor module 400 may require different voltages, such as 5V, and as such the DC-DC converter 474 may be configured to provide 5V within the sensor module 400 based on the 12V input DC.

In operation the sensor module 400 may be configured to provide sensory related functions, along with additional functions (e.g., communication, processing, etc.), and to do so specifically in mesh network comprising a plurality of mesh network nodes, where at least some of the mesh network nodes are mobile nodes—namely, drone based nodes (e.g., similar to the drone 300 described with respect to FIG. 3). In particular, the sensor module 400 may be configured to obtain or generate sensing data using sensory components embedded therein (or coupled thereto), such as the radar sensor 440, the optical sensor 450, etc. In this regard, the radars may provide long range and high-resolution 3D sensing, whereas the cameras (or other optical sensors) may provide short range and high accuracy object recognition. Further, other sensor types may be used—e.g., in plug-and play manner, with the sensor module 400 being configured to support doing so.

Further, obtaining the sensing data may be optimized, which may include optimizing obtaining the sensing data even when the sensor module 400 is deployed in mobile platform (e.g., drone). In addition, the sensor module 400 may be configured to facilitate and/or support providing shared fields of view with respect to obtaining or generating sensing data, such as when operating with other sensor modules (e.g., each similar to the sensor module 400, but the disclosure is not so limited) within the mesh network. This may be done by using of multiple instances of the sensor module 400, which may be incorporated into multiple platforms (though, in some instances, multiple instances of the sensor module 400 may be incorporated into a same platform).

The sensor module 400 may also be configured to process at least some of the obtained sensing data, and/or to communicate with other entities (e.g., other sensors, mesh network nodes, etc.), such as to facilitate communication of sensing data and/or information obtained based thereon. In this regard, the sensor module 400 may be configured to provide fast real-time edge processing—e.g., to independently process radar and optical streams. In some instances, real-time object detection, classification, and tracking may be performed using AI based processing. In this regard, the edge compute CPU/GPU 420 may incorporate, e.g., high-performance embedded GPU and multi-core CPU that may be configured to run AI algorithms and associated software. The sensor module 400 may also be configured such that it may be modifiable to enable supporting other types of processors (or processing techniques), such as neuromorphic processors/processing, if needed.

With respect to communication functions, the sensor module 400 may utilize its networking capabilities (e.g., via the network board 430, and antennas 432 and/or Cat5 connectors 434) to share sensing data over a private network. Communications can also be done using an external mesh (e.g., connected over SuperSpeed USB). Sharing of sensing data (and/or information obtained based thereon) may facilitate fusing of data within the network, and the sensor module 400 may be configured to facilitate and/or support such fusing of data. In this regard, distributed data fusion requires extremely accurate timing synchronization and position/pose information from all nodes. For example, the integrated GNSS timing hardware and proprietary time synchronization firmware and software may be used to enable each sensory unit to achieve high level of synchronization (e.g., sub-10 ns level synchronization), which may be similar to timing synchronization accuracy in 5G base stations. Further, the GPS/DO unit 410 may be used to provide accurate 3D coordinate and heading/rotation information required to combine detection and tracking from multiple sensor nodes.

In some instances, to further optimize operation in the sensor module 400, high-speed internal Ethernet and USB bus and connector(s) may be used therein connect all devices and components of the sensor module 400, such as at speeds of 1+Gbps.

Figure 5:
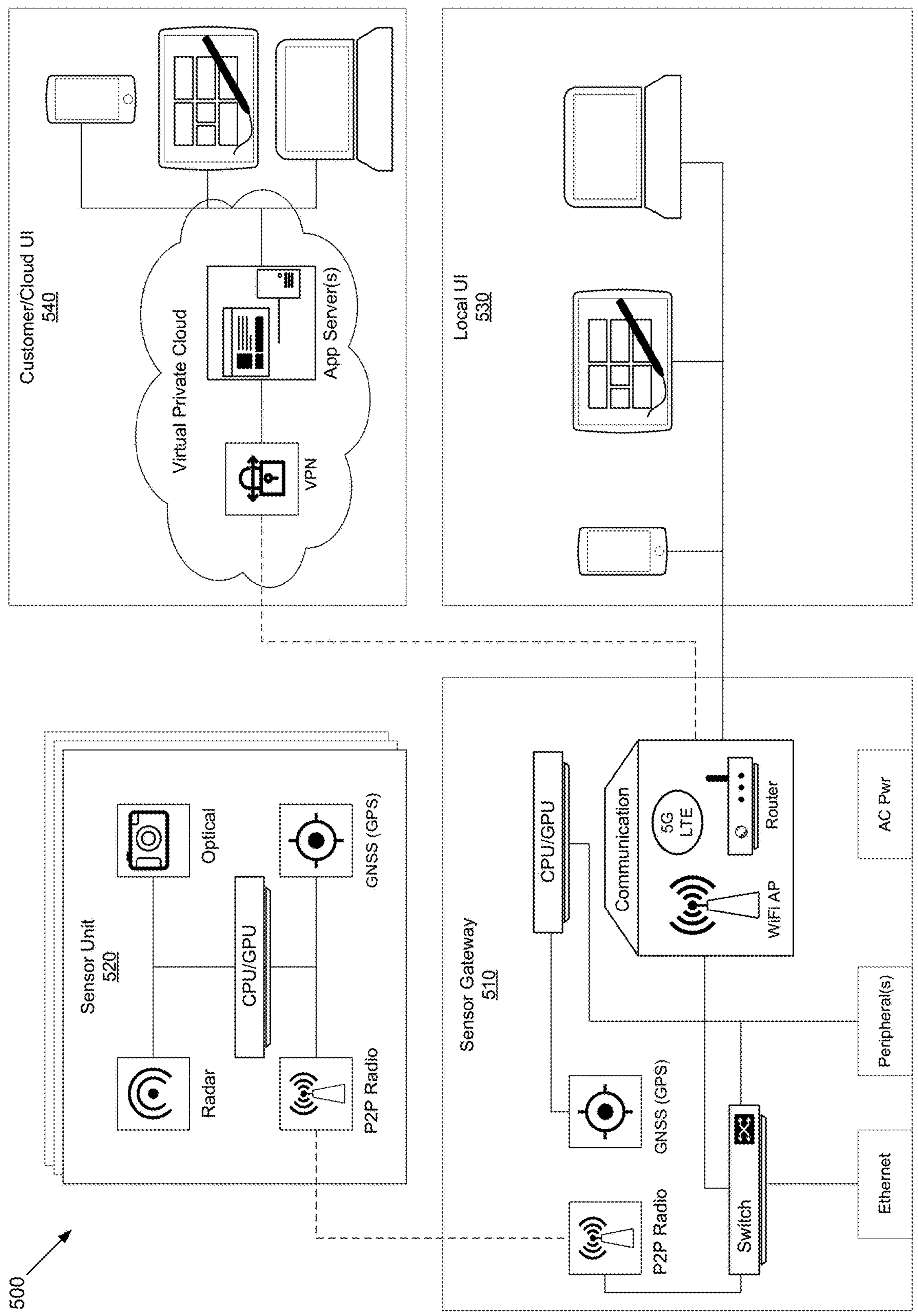
FIG. 5 illustrates an example multi-modal sensor based network architecture, in accordance with an example embodiment of the disclosure.

FIG. 5 illustrates an example multi-modal sensor based network architecture, in accordance with an example embodiment of the disclosure. Shown in FIG. 5 is multi-modal sensor based network architecture 500, with sensor gateway in communication with network nodes, local resources and remote resources, which is configured for supporting multi-modal sensor solutions as described herein. In this regard, as noted, in some instances the multiple sensors may, alternatively, be all of one type (e.g., multiple radar sensors).

As illustrated in the example embodiment shown in FIG. 5, the multi-modal sensor based network architecture 500 comprises a sensor gateway 510, one or more sensor units 520, a local user interface (UI) 530, and a customer/cloud user interface (UI) 540.

The sensor gateway 510 may comprise suitable circuitry and other hardware resources for providing gateway related functions in multi-modal sensor based networks. For example, as shown in FIG. 5, the sensor gateway 510 may comprise a point-to-point or mesh (P2P/mesh) radio, global navigation satellite system (GNSS) radio (e.g., a Global Positioning System (GPS) radio), a communication unit, processing unit(s), and a switch.

The P2P/mesh radio may be configured for enabling communications within a mesh network (e.g., with the sensor units 520, such as via corresponding P2P/mesh radio(s) therein). The GNSS radio may be configured for enabling GNSS related communications, such as reception of GNSS based signals, and processing thereof (e.g., to enable obtaining positioning related measurement). Nonetheless, in some instances, at least some of the processing may be performed in other components (e.g., the processing unit(s)).

The communication unit may be configured for facilitating and controlling communication functions, using wireless and/or wired based connections. As such, the communication unit may incorporate one or more wireless radios which may be configured to provide or support cellular connectivity (e.g., 4G/LTE, 5G, etc.) via cellular network(s), a WiFi access point for providing localized WiFi communication, etc. The communication unit may also incorporate a router configured for handling routing of data to and/or from the gateway. The communication unit may also be configured to provide VPN client function to facilitate interactions with cloud server(s).

The processing unit(s) may be configured for providing processing and related storage functions associated therewith. In this regard, the processing functions may control, data processing (including video/graphics processing, such as video data obtained during sensory/detection operations). For example, the processing unit(s) may comprise one or more central processing unit (CPU), one or more graphics processing unit (GPU), etc. The processing unit(s) may be configured for facilitating and controlling local interfaces, connectors, and ports (e.g., Ethernet, High-Definition Multimedia Interface (HDMI), USB, peripheral port(s), DC power, and the like (and peripheral devices connected thereto, if any, such as, e.g., keyboard, mouse, etc.). In some instances, the processing unit(s) may be configured for utilizing advance processing techniques, such as AI processing. The switch may be configured for facilitating interactions among the various elements of the sensor gateway 510, particularly at high-speed (e.g., 1+Gbps).

Each of the sensor units 520 may comprise suitable circuitry and other hardware resources for providing edge sensing related functions in multi-modal sensor based networks. For example, as shown in FIG. 5, each sensor units 520 comprises a P2P/mesh radio, a GNSS (e.g., a GPS) radio, processing unit(s), a radar, and an optical sensor (e.g., camera). In this regard, the P2P/mesh radio may be configured for enabling communications within a mesh network (e.g., with the sensor gateway 510 and/or with other sensor units 520). The processor unit(s) may comprise one or both of CPU and GPU, and may be configured for providing processing and related storage functions associated therewith, including, inter alia, supporting and/or facilitating AI sensing, fusing, and sharing functions, as described herein. The GNSS radio may be configured for enabling GNSS related communications, such as reception of GNSS based signals, and to facilitate or support processing thereof (e.g., to enable obtaining positioning related measurement). The radar may be configured to provide radar detection (e.g., based on or using mmWave signals), whereas the optical sensor may be configured to obtain optical sensing data (e.g., videos or still images when the optical sensor is a camera).

The local UI 530 may comprise one or more local user/UI devices (e.g., mobile phones, tablets, personal computers, etc.). The customer/cloud UI 540 may comprise a virtual private cloud and one or more remote user/UI devices. The virtual private cloud may comprise one or more servers (and other systems) for providing VPN based cloud related services. For example, as shown in FIG. 5, the virtual private cloud may comprise VPN gateway server and an application (app) server.

In operation, the sensor gateway 510 may provide gateway functioning e.g., bridging the sensor units 520 (and any mesh formed thereby) to local and/or remote user devices, and/or (optionally) providing connectivity within the mesh network, such as between different sensor units 520. Data available at the sensor gateway 510 may be aggregated, processed, and made available to the local UI 530 and/or customer/cloud UI 540. In this regard, the WiFi access point in the sensor gateway 510 may enable local user devices to utilize the sensor units—e.g., view live mission data, such as high-resolution streaming video, or radar tracking data. Further, the sensor gateway 510 may provide secure connectivity to remote devices, such as VPN connection(s). In this regard, the communication unit may be used in establishing a secure VPN tunnel to the VPN gateway of the customer/cloud UI 540, such as using cellular (e.g., 4G/LTE) links via the LTE radio. The virtual private cloud may then provide secure remote access by the remote user/UI devices. The same arrangement(s) may allow for control of the sensor unit 520 by the local user/UI devices (e.g., via the local WiFi access point, then through the switch and the P2P/mesh radio(s)) and/or the remote user/UI devices (e.g., via the VPN connection(s) over the 4G/LTE or 5G link(s), then through the switch and the P2P/mesh radio(s)).

In accordance with present disclosure, the multi-modal sensor based network architecture 500 may be configured to provide collaborative network of multi-mode sensors for detecting and tracking objects, and for performing distributed hierarchical fusion of data, and edge computing as described herein. In this regard, as illustrated in FIG. 5, such multi-model sensor system may be deployed with more than one sensor unit 520 along with at least one sensor gateway 510, to enable providing enhanced sensing operations—e.g., extended range, different types of sensing data, aggregation of sensing data, etc. Each sensor unit 520 may have its own power source, and may be mounted adaptively or differently—e.g., on a pole, portable mast, vehicle, or other compatible structure—to enable sensing the environment continuously. End-user devices connected to the sensor gateway 510 may receive sensing data and/or information based thereon—e.g., corresponding to sensor perception of observed environment tracking and identifying objects of interest.

Sensor units 520 and sensor gateway 510 at the edge are self-contained to sense the surroundings, fuse observations from sensors, identify and track object movements in real-time, locate in a three-dimensional (3D) topographical map and communicating perception to end users.

The local UI 530 may allow local interfacing (e.g., via suitable physical interface via any suitable device) for managing the network of sensor units 520 as well as viewing real-time target data. The customer/cloud UI 540 may allow remote interfacing in similar manner. Using such interfacing capabilities, user(s) may, e.g., configure radar and optical sensing options, tune performance, update firmware/software, monitor status of devices and the network, as well as view live target detection, tracking, and classification data. If desired, the same data presented to a user can be accessed using the 3rd party API enabling easy integration with other systems.

In some instances, AI processing may be used, such as in processing obtained sensing data, aggregating (or fusing) sensing data, etc. In this regard, AI processing on-board of sensor unit 520 performs object classification and tracking in real time, using the communication to share processed sensor data with the sensor gateway 510. For example, the sensor gateway 510 regularly gathers one or more feeds from each sensor unit 520 preparing a unified view.

In some instances, target range or coverage area may be extended, such as simply by adding more sensor units 520 and/or more instance(s) of the sensor gateway 510. In this regard, such self-forming sensor network seamlessly adds units as long as they are in network reach—e.g., up to 1-mile between sensor and gateway. An example of such extended arrangement is illustrated in, and described in more detail below with respect to FIG. 8.

The multi-modal sensor based network architecture 500 may enable users to maintain situational awareness of their surroundings. In this regard, the multiple sensor units 520 may be used in obtaining or generating sensing data, with the sensor gateway 510 610 supporting edge computing (including fusing and/or aggregating of sensing data), and providing interfaces for both human and applications to interact with the sensor system as a whole. Sensor units 520 may be deployed adaptively—e.g., mounted statically (e.g., on a pole), on portable mast, or to a mobile platform, a vehicle, or a UAV—to sense the environment continuously. Each sensor unit 520 has optical and/or radar sensor to independently sense objects in real-time. The computing resources in the sensor unit(s) 520 and/or the sensor gateway 510 may be used to process sensor feeds locally. The GNSS (GPS) units may track sensor locations, and use that location information in tagging the sensing data with coordinate and time references. The communication service maintains stable link with the sensor gateway 510 communicating data and device operating status.

The sensor gateway 510 may utilized its computing, storage, advanced communication, and location services related resources to connect the sensor network with the users or other applications. The computing infrastructure (e.g., the processor(s) in the sensor gateway 510) may be used to run control applications administer and manage sensor units 520. The situational awareness applications provide continuous perception of the surroundings. The sensor gateway 510 supports an interactive user interface to enable connecting directly to observe the environment. Applications may communicate with the sensor gateway 510 over an open API using messages that allows third-parties to source and integrate sensing data with their applications. Third-party applications may use the sensing data deriving value-add usage, detecting friendlies and foes, safe-navigation, etc. The local UI 530 and/or the customer/cloud UI 540 may provide an interface for managing the network of sensor units 520 as well as viewing real-time target data. The UI connects securely to the sensor gateway 510 from handheld smart phones, tablets or PCs to observe environment and monitor the devices. In some instances, on-board GPUs in the sensor units 520 and the sensor gateway 510 may be configured to enable local AI processing mimicking human observer observing the environment sharing info with central command. In some instances, more sensor units 520 can be added to an existing sensor network to extend the coverage.

Figure 6:
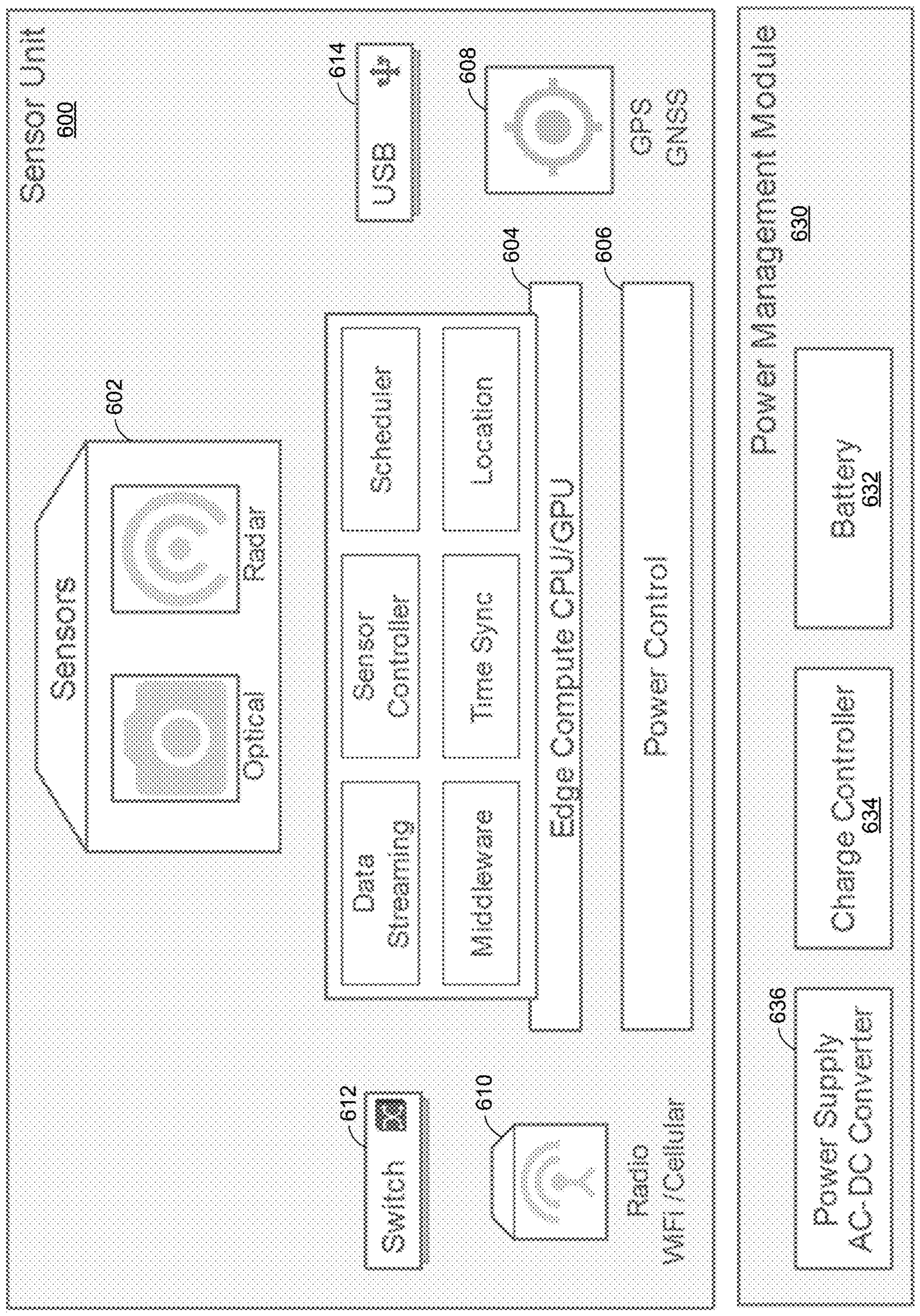
FIG. 6 illustrates an example sensor unit, in accordance with the present disclosure.

FIG. 6 illustrates an example sensor unit, in accordance with the present disclosure. Shown in FIG. 6 are a sensor unit 600 and a power management module 630.

The sensor unit 600 may comprise suitable circuitry and other hardware resources for providing edge sensing related functions in multi-modal sensor based networks as described herein. In this regard, the sensor unit 600 may represent an example embodiment of multi-modal sensor that may be configured and/or may operate in substantially manner similar manner as the sensor module 400 of FIG. 4 and/or the sensor unit(s) 520 of FIG. 5. The power management module 630 may comprise suitable circuitry and other hardware resources for facilitating and/or supporting providing power to the sensor unit 600.

In the example embodiment illustrated in FIG. 6, the sensor unit 600 comprises a sensors module 602, an edge processing module 604, a power management module 630, a GNSS (e.g., a GPS) radio 608, an on-board radio 610, a switch module 612, and a Universal Serial Bus (USB) hub 614. The power management module 630 comprises a battery 632, a charge controller 634, and power supply 636.

The sensors module 602 may comprise one or more sensors configured to obtain or generate sensing data. The sensors module 602 may incorporate different types of sensors, to providing different sensing data. For example, as shown in FIG. 6, the sensors module 602 incorporates a radar and an optical sensor (e.g., camera). In this regard, the radar may be configured to provide radar detection (e.g., based on or using mmWave signals), whereas the optical sensor may be configured to obtain optical sensory data (e.g., videos or still images when the optical sensor is a camera).

The edge processing module 604 may comprise one or both of CPU and GPU, and may be configured for providing processing and related storage functions associated therewith, including, inter alia, supporting and/or facilitating processing of sensing data, data fusing, and data sharing, as described herein. In some instances, the edge processing module 604 may be configured to support use of advanced processing techniques, such as AI based processing, particularly in conjunction with edge sensing related functions. The edge processing module 604 may be configured to incorporate various modules configured for handling or supporting different functions or services. For example, the edge processing module 604 may incorporate a data streaming module, a sensor controller module, a scheduler module, a middleware module, a time synchronization (synch) module, and a location module.

The power management module 630 may be configured for controlling and/or managing power related functions in the sensor unit 600. In this regard, the power management module 630 may control or manage inputting of power (including any power ports or connectors used therein), distributing of power within the sensor unit 600, any required power conversions (e.g., providing different voltages, etc.), and the like.

The GNSS module 608 may be configured supporting GNSS (e.g., GPS) functions, including support of GNSS (e.g., GPS) related communications, such as reception of GNSS (e.g., GPS) based signals, and to facilitate or support processing thereof (e.g., to enable obtaining positioning related measurement). The on-board (e.g., WiFi/cellular) radio module 610 may be configured for enabling communications by the sensor unit 600, particularly within a mesh network (e.g., with sensor gateway(s) and/or with other sensor units), such as using WiFi and/or cellular based connections.

The switch module 612 may be configured for facilitating interactions among the various elements of the sensor unit 600, particularly at high-speed (e.g., 1+Gbps). The USB hub 614 may be configured for facilitating USB related communication and/or controlling USB related functions within the sensor unit 600, based on one or more USB standards (e.g., USB 3.0).

In operation, the sensor unit 600 may be configured for providing edge sensing related functions in multi-modal sensor based networks as described herein. In this regard, the sensor unit 600 may utilize the sensors module 602 to obtain or generate sensing data. As noted, the sensors module 602 may incorporate different sensors, such as a radar and an optical sensor (e.g., camera). Use of both radar and optical sensors may be advantageous because radars and cameras may have a shared and overlapping fields of views both horizontally and vertically allows both sensors observing same area at the same time. For example, use of the combination of radar and optical camera covers an area 110 degrees horizontally and 80 degrees vertically. The radar (e.g., an mmWave radar) senses long ranges in four-dimensional (4D) manner (range, velocity, azimuth, and elevation), under multiple lighting conditions (day and night) and/or weather conditions (rain, fog, snow, etc.), and even in smoke sensing under verity of conditions. The optical sensor (e.g., camera) provides high-resolution images and/or videos of the surrounding environment, but under more limited conditions (e.g., from dawn to dusk and low lights). The GNSS module 608 may be configured to use multi-constellation of satellites to determine geo coordinates of the sensor unit 600 periodically. In this regard, GNSS (e.g., GPS) satellites may provide accurate time signals. The GNSS module 608 may also incorporate GNSS magnetometer which may be configured to use earth's magnetic coordinates to determine the heading of the sensor unit 600. A request to the programming interface provides time, latitude, longitude and heading of the sensor unit 600.

The edge processing module 604 may provide required control and processing function during sensing operation. In this regard, the obtained sensing data may be fed from both sensors into the edge processing module 604 to be processed real-time (e.g., edge computing), such as using CPU and/or GPU processing, using supported applications. For example, the data streaming module of the edge processing module 604 may independently collect feeds from both optical and radar sensors, process using a pipeline of signal processing and AI modules outputting object detection, classification and tracking in real-time. The output includes detected objects their location coordinates. The sensor controller module may support operations and tracking of both optical and radar sensors. It has the sub-modules that interface with the radar and camera operations in real-time providing configuration parameters. The scheduler module may maintain schedule of the processing tasks (jobs), such as those that will be run on one or both of the CPU and GPU. As the jobs get executed, statuses are collected and made available to the audit logs. The middleware module may provide a framework of persistence topics and messages for interprocess communications allowing asynchronous detached processing. Subscribing processes get messages from the topics and producers process post messages to the topics for other processors to consume. The time sync module may provide interfaces for hardware boards, processors to initialize clocks up to nanosecond accuracy. Processes in the data streaming module and the middleware module may use the timestamp to tag data blocks. The location service module may use the on-board positioning functions (e.g., IMU and multi-constellation GNSS positioning, provided via the GNSS module 608) to obtain or generate location data, such as to provide accurate 3D coordinate and heading/rotation for the sensors. The location data may be tagged with the output from the data streaming module.

The on-board radio module 610 may provide and/or maintain communication links, such as via high-speed, reliable and secure two-way interface (e.g., with a sensor gateway and/or other sensor units) over a private network. The communications may include periodic sharing of sensing data, operation statuses, and device control directives. The implementation supports multiple forms of wireless communication, including cellular and WiFi standards as required (e.g., by the users). The switch module 612 provides Ethernet connectivity internally between modules allowing data sharing at high bandwidth with the software processes running on the Edge processing module 604, and the USB hub 614 may support Ethernet networking over USB 3.0 protocol allowing high-speed data transfer from radar sensor to the EDGE compute.

The power management module 630 may provide power supply, and management thereof, in support of the sensor unit 600. For example, the power management module 630 may incorporate voltage regulators allowing supply of reliable power to internal processing components. The power management module 630 may be designed and/or configured to enable a wide range of sensor deployments with power options such as standard AC or local source (e.g., solar panels, wind turbine, etc.). The battery 632 supplies power to the sensor unit for operation. In this regard, the battery 632 may be used in storing charge for supplying to the sensor unit 600. For example, the battery 632 may be a rechargeable battery configured to hold charge for 12+ hours of run-time before recharging is required. Thus, in the case of power loss (e.g., from either AC or local source, such as solar panel), the battery enables the system to continue running uninterrupted. The charge controller 634 charges the battery 632 and supplies power to the sensor unit 600. The power may come from the either from the AC input or from the local source (e.g., solar panel). The power supply 636 supports plugging in to a standard 120/230V AC line. The power supply 636 may incorporate an AC-DC converter which may be used to modify the input AC to DC power for supplying the sensor unit 600, via the charge controller 634, at pre-determined DC power criteria (e.g., 12V at 8A with 100 W maximum).

Figure 7:
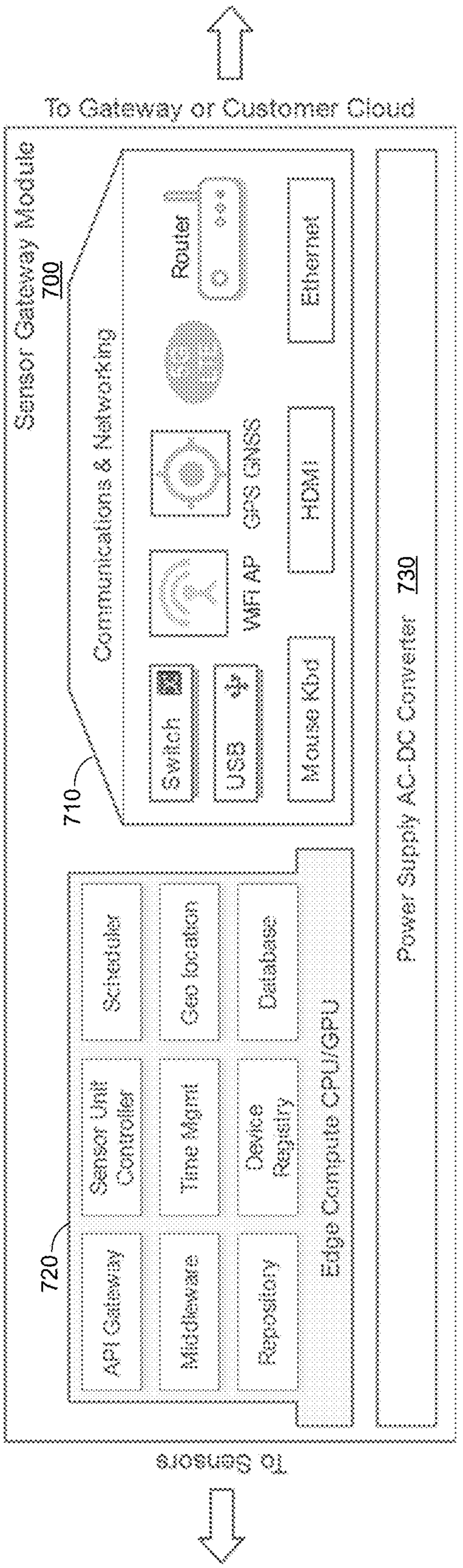
FIG. 7 illustrates an example sensor gateway, in accordance with the present disclosure.

FIG. 7 illustrates an example sensor gateway, in accordance with the present disclosure. Shown in FIG. 7 is sensor gateway 700. The sensor gateway 700 may comprise suitable circuitry and other hardware resources for providing gateway related functions in multi-modal sensor based networks as described herein. In this regard, the sensor gateway 700 may represent an example embodiment of sensor gateways, and may be configured and/or may operate in substantially manner similar manner as the sensor gateway 520 of FIG. 5.

In the example embodiment illustrated in FIG. 7, the sensor gateway 700 comprises a communications/networking module 710, an edge processing module 720, and a power supply/AC-DC converter 730. The communications/networking module 710 may be configured to providing and/or supporting various communication and/or networking related functions or services in the sensor gateway 700.

In this regard, the communications/networking module 710 may be configured to incorporate various modules or components configured for handling or supporting different functions or services. For example, the communications/networking module 710 may incorporate a GNSS module, a WiFi access point (AP), 5G/LTE module, a router, a switch, a USB hub, an HDMI module, an Ethernet module, and a mouse/keyboard module.

The GNSS module may be configured supporting GNSS (e.g., GPS) functions, including support of GNSS (e.g., GPS) related communications, such as reception of GNSS (e.g., GPS) based signals, and to facilitate or support processing thereof (e.g., to enable obtaining positioning related measurement). The WiFi access point (AP) module may be configured for enabling WiFi communications, particularly by providing WiFi AP related functions and/or supporting WiFi based connections. The 5G/LTE module may be configured for enabling cellular based communications, such as 5G/LTE based communications. The WiFi access point (AP) module and the 5G/LTE module may be configured for enabling communications by the sensor gateway 700, such as using WiFi and/or cellular based connections, within a mesh network (e.g., with sensor units and/or with other sensor gateway(s)) and/or with other local devices (e.g., to provide local UI). The switch module may be configured for facilitating interactions among the various elements of the sensor gateway 700, particularly at high-speed (e.g., 1+Gbps). The USB hub may be configured for facilitating USB related communication and/or controlling USB related functions within the sensor gateway 700, based on one or more USB standards (e.g., USB 3.0).

The router may be configured for handling routing of data to and/or from the gateway, such as with local and/or remote devices (via local UI and/or remote UI). This may include support use of VPN connections. The HDMI module may be configured for supporting use of HDMI connections (e.g., for providing access to video or imaging data). The Ethernet module may be configured for supporting Ethernet connections. The peripherals module may be configured to support use of mouse and keyboard connection (and/or other types of peripheral connections/devices).

The edge processing module 720 may comprise one or both of CPU and GPU, and may be configured for providing processing and related storage functions associated therewith, including, inter alia, supporting and/or facilitating processing of sensing data, data fusing, and data sharing, as described herein. In some instances, the edge processing module 720 may be configured to support use of advanced processing techniques, such as AI based processing, particularly in conjunction with edge sensing related functions. The edge processing module 720 may be configured to incorporate various modules configured for handling or supporting different functions or services. For example, the edge processing module 720 may incorporate an API gateway module, a sensor unit controller module, a scheduler module, a middleware module, a time management module, a geo-location module, a repository module, a device registry module, and a database module.

The power supply module 730 may be configured for providing and/or managing power supply related functions in the sensor gateway 700. In this regard, the power supply module 730 may control or manage inputting of power (including any power ports or connectors used therein), distributing of power within the sensor gateway 700, any required power conversions (e.g., providing different voltages, etc.), and the like.

In operation, the sensor gateway 700 may be configured for providing sensing gateway related functions in multi-modal sensor based networks as described herein. In this regard, the sensor gateway 700 may be configured to support both compute and advance networking for the sensor network. For example, the sensor gateway 700 may effectively form a secure base station for a private sensor network for sensor units to communicate, and bridge connecting to a local external network for UI, or other cloud-applications or other gateways. The compute infrastructure in the sensor gateway 700 (e.g., the edge processing module 720) may provide support for the sensor feed processing and administration and management of the sensor network. This may be done, for example, via the various modules of the edge processing module 720.

For example, the application programming interface (API) gateway module may enable secure interfaces to external entities such as UI or applications to retrieve data from the sensor system and manage the network remotely. The Middleware module may provide a robust low-latency messaging platform for devices and programming modules to communicate asynchronously with reliability. The repository module may provide storage location to store application image bundles which are or will be deployed in the sensor units or sensor gateway 700 (or other sensor gateways). The sensor unit controller module may function as administration module that manages configuration and operation of sensor units present in the sensor network. Time management module may providing time management related functions, such as time synchronization—e.g., synchronizing all the clocks to millisecond accuracies so that the entire distributed sensor network operates as a single unit. The device registry module may provide registry related functions—e.g., registering every sensor units that are part of the network allowing communication, enforcing operational policies and recording states. For example, the device registry module may maintain two separate lists of devices that are allowed and denied within the network. The scheduler module may keep track of all current and future processing activities taking place within the network. The geo-location module may obtain or generate geo-location information, and may provide a database of location of all the sensors units and algorithms to convert local senor coordinate system to global coordinate. The database module may be configured as time-series database that keeps track of identified objects, detected positions, headings. Also records configuration and policies applied to each sensor unit.

In some instances, the sensor gateway 700 may form two separate network zones called front-haul and back-haul. The front-haul network is dedicated to traffic communicating with the sensor units. Given geo-location of each sensor unit at a given time, forms the beam for communication in the direction to maximize the throughput. The back-haul provides multiple options to communicate with the UI or external customer cloud gateway. The Backhaul communicates with one or more types of network—e.g., cellular (5G/LTE) network, WiFi, or Ethernet. The GNSS (e.g., GPS) module in the sensor gateway 700 acts as a master time-keeper for entire sensor network keeping all the clocks in the sensor units sync with this master at millisecond level. For example, using multi-constellation of satellites, GNSS (e.g., GPS) module may track the latitude and longitude of the sensor gateway 700, which may be referred to as "central location" for the sensor system with sensor units' locations relative to the central location. The master location helps cast each sensor unit's field vision over a global map. The switch and USB hub may provide internal connections between devices within the sensor gateway 700.

The power supply module 730 may provide power related functions within the sensor gateway 700 (including supply of power, and management/control thereof). For example, power supply module 730 may be a standard 120V AC connection and related circuitry. In some instances, the power supply module 730 includes an AC-DC converter with multiple output to supply the edge compute and other communication devices running within the Gateway. Further, mouse, keyboard, USB, HDMI, and Ethernet connections optionally may be supported and used in conjunction with operation of the sensor gateway 700.

Figure 8:
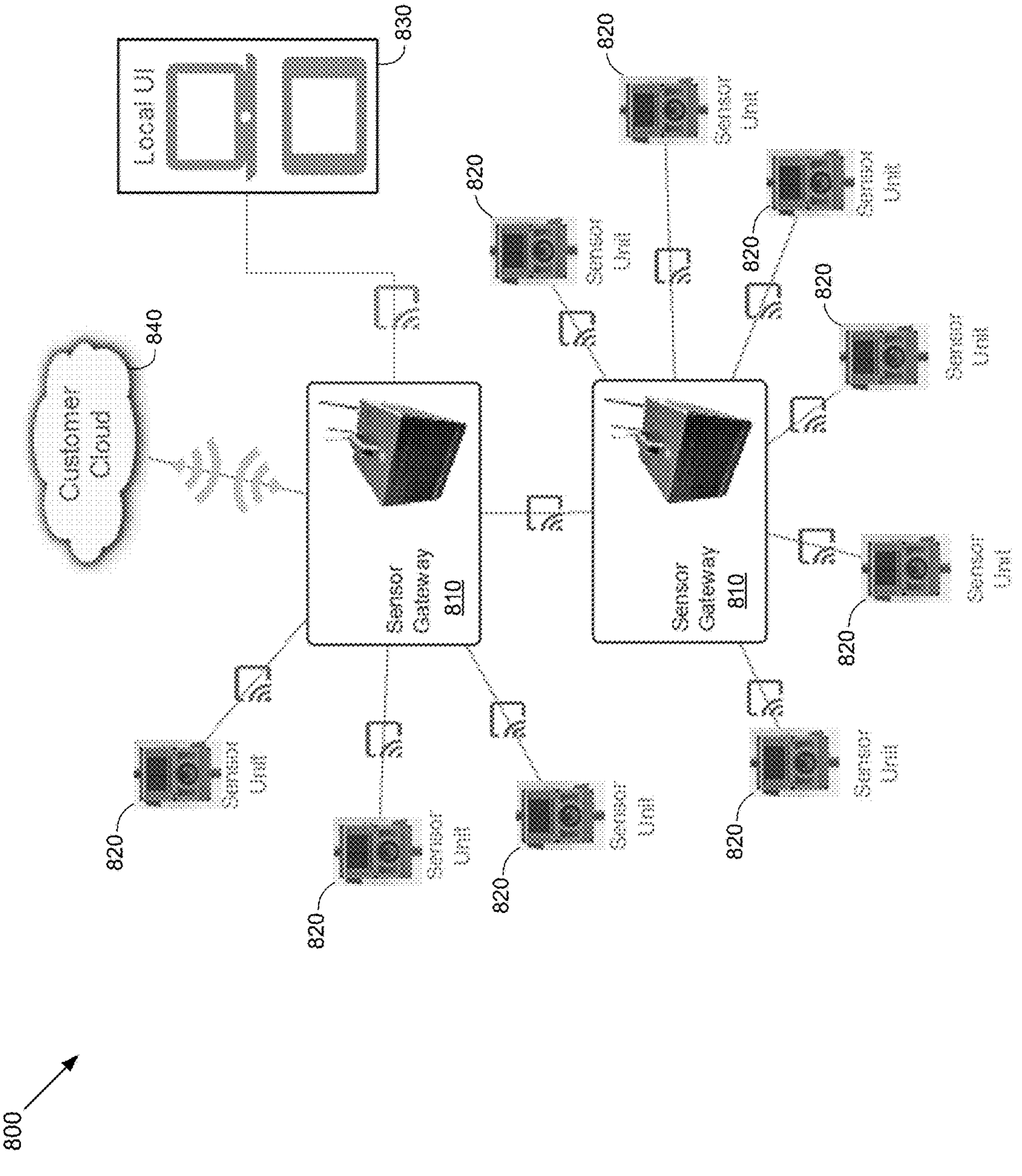
FIG. 8 illustrates an example network with sensor units and sensor gateways for extending sensory functions and fusing sensory data, in accordance with the present disclosure.

FIG. 8 illustrates an example network with sensor units and sensor gateways for extending sensory functions and fusing sensing data, in accordance with the present disclosure. Shown in FIG. 8 is a network 800 comprising a plurality of sensor gateways 810, a plurality of sensor units 820, a local user interface (UI) 830, and a customer/cloud 840. In this regard, each of these elements may be configured and/or may be operate in substantially similar manner as other, similarly named elements as described above, such as with respect to FIGS. 4-7.

As illustrated in FIG. 8, the network 800 may be configured to facilitate and support use of multiple sensors in mesh networking based settings, and to provide collaborative multi-mode sensing for detecting and tracking objects, with distributed hierarchical fusion of data and edge computing. However, the network 800 may be further arranged to enable extending coverage. In this regard, as illustrated in FIG. 8, a plurality of sensor gateways 810 (such as two sensor gateways 810 in the example implementation shown) may be used (rather than a single sensor gateway), with these multiple sensor gateways being connected, such as over backhaul interfaces, to extend sensor network coverage indefinitely. In such mode, multiple sensor gateways may form a cluster, with one acting as a master (primary) sensor gateway, and other sensor gateway(s) operating as slaves (secondary gateways). Further, all sensor units 820 in the extended network may be configured to act as single unit observing extended environment.

In such extended network, the master (primary) sensor gateway may be configured to provide an entry point for entire sensor network management and object tracking. Further, redundant network paths maintained at the master (primary) sensor gateway may be utilized to address equipment and communication failure and recovery. In addition, connection(s) between master (primary) sensor gateway and each of the local UI 830 and the customer/cloud 840 may be used to provide local and/or remote access to sensing data and/or information obtained based therein.

Accordingly, solutions in accordance with the present disclosure may offer various benefits and/or improvements over any existing solutions. For example, solutions based on the present disclosure may allow for improved detection and/or tracking. In this regard, networked operation increases accuracy and resolution of targets at a distance using shared fields of view from multiple sensors. For example, if more than one sensor is viewing the same target at the same time, with the information obtained by the sensors shared, probability of detection and tracking accuracy may increase significantly.

Solutions based on the present disclosure also may allow for improved coverage. In this regard, the sensors, when used in an airspace or perimeter security application, may easily extend range by passing tracks from one node to the next in a seamless manner, much like the way your cellphone hands off from one tower to the next.

Solutions based on the present disclosure also may allow for improved resiliency. In this regard, since the sensing system is a distributed network there is no longer a single point of attack or failure, unlike large traditional systems. Also, the portability and rapid setup of the system means that devices can be moved to constantly shift the attack surface and to patch holes in the sensor network due to adversarial action. Using a mesh network, the network is self-healing meaning that if a node is lost, the network can reroute or establish new links.

Solutions based on the present disclosure also may allow for improved prediction. In this regard, the networked nature of the sensors enables distributed collaborative sensing where intelligence or target tracking information is shared during or prior to detection. For example, the proposed multi-sensor systems and/or networks may create an advanced radar plus optical collaborative AI sensing system.

Solutions based on the present disclosure also may allow for improved interoperability. In this regard, in various implementations integrated networking capabilities may use standard protocols and interfaces making the system nearly plug and play when it comes to interoperating with a 3rd party system. Additionally, modular open system based approach may be used, and therefore application programming interface (API) to the system may be developed the using available open-source technology for simple and fast integration.

Solutions based on the present disclosure also may allow for improved scalability. In this regard, whereas traditional sensor systems are typically hard to maintain and upgrade due to their monolithic nature, proposed multi-sensor systems and/or networks based on the present disclosure may be built to deliver endless scalability and new capability to the user. Since the proposed multi-sensor systems and/or networks utilize distributed sensor networks new nodes may be added to improve range or detection and tracking accuracy. Further, since various aspects of the proposed multi-sensor systems and/or networks may be software defined and built for delivery of updates and new releases, there may be a constant stream of new capabilities flowing to end users to scale the system in new ways.

Solutions based on the present disclosure also may be AI enabled. In this regard, identifying and classifying objects using radar systems is extremely complex and requires many layers of software to remove background clutter, avoid false detections, and estimate target properties like RCS. The proposed multi-sensor systems and/or networks may leverage new approaches with AI at the edge to significantly enhance radar object detection, tracking, identification, and classification in ground-to ground, air-to-air, ground-to-air, air-to-ground scenarios. For example, the onboard AI capability may be used remove clutter and noise, and exploits feature rich RF and optical data to extract new layers of information, thus enabling better data driven decision-making.

Solutions based on the present disclosure also may allow for improved usability. In this regard, securing a perimeter or airspace with radar, optical, or other sensors has traditionally been an arduous task requiring many skills, and lengthy training. For example, use of and support of user interface (UI) functions, including one or both of local UI and remote UI, may simplify installation, operation, and administration of sensors in network through intelligent software, simple to use interfaces thus significantly reduces time and complexity to deploy and operate.

Solutions in accordance with the present disclosure may have various possible use applications, and/or may allow for optimized performance when used compared to any existing solutions. For example, proposed multi-sensor systems and/or networks may be used for ground perimeter security, airspace monitoring, counter-unmanned aircraft systems (UAS), autonomous navigation, tracking of small moving objects (e.g., golf balls, baseballs), etc. In this regard, proposed multi-sensor systems and/or networks may be configured for, e.g., collaboratively surveilling, detecting, and/or tracking drones, aircraft, ground objects (cars, people, etc.), boats/ships, etc., and/or used for small moving objects (particularly in certain sports, such as golf (golf balls), baseball (detecting and tracking baseballs), etc. To that end, sensor modules/units described herein may be configured for deployment on various platforms, such as (without being limited to) drones (e.g., fixed wing drones, rotary based drones, etc.), aircraft (manned or unmanned), ground vehicles (e.g., cars), boats/ships, etc. In some instances, proposed multi-sensor systems and/or networks may be configured for unique applications, such as surveilling, detecting, and/or tracking certain animals (e.g., whales), or in weather forecasting related functions (e.g., detecting and tracking of rain, hail, etc.).

An example edge sensor unit, in accordance with the present disclosure, may be configured for operating in a communication network comprising a plurality of network nodes, the edge sensor unit comprising: a plurality of sensor devices configured for obtaining sensory data; one or more processing circuits configured for one or both of controlling and processing of data; and a communication module comprising one or more communication circuits configured to facilitate or support local communication with one or more other nodes in the communication network; wherein the edge sensor unit is configured to communicate with one or both of at least one other edge sensor unit or a sensor gateway node configured to provide connectivity to edge sensor units in the communication network; wherein the one or more processing circuits are configured to perform or support fusing of sensory data obtained by the edge sensor unit and at least one other edge sensor unit in the communication network.

In an example embodiment, the communication network comprises a mesh network.

In an example embodiment, the communication module comprises a point-to-point radio configured for communication within the communication network.

In an example embodiment, the communication module is configured to enable or support one or more of WiFi, cellular, and satellite based communication.

In an example embodiment, the communication module comprises or is coupled to one or more antennas, and wherein the one or more communication circuits is configured to support or control communication via the one or more antennas.

In an example embodiment, the one or more antennas comprise at least one multiple-input and multiple-output (MIMO) antenna, and wherein the one or more communication circuits is configured to support or control communication via the MIMO antenna.

In an example embodiment, the edge sensor unit further comprises one or more positioning devices configured to obtain one or both of geo-positioning data and orientation data.

In an example embodiment, the one or more processing circuits are configured to determine, based on the geo-positioning data and orientation data, accurate location and heading related data for the edge sensor unit compensating for object detection locations in real-time or near real-time expanding applicability in moving and static sensor units.

In an example embodiment, the one or more processing circuits are configured to determine, based on the geo-positioning data and orientation data, compensating adjustments or corrections for object detection locations. The adjustments or corrections may be made in real-time or near real-time.

In an example embodiment, the plurality of sensor devices are configured to obtain sensory data corresponding to or based on at least two different types of sensing technologies.

In an example embodiment, the at least two different types of sensing technologies comprise optical sensing and radar sensing.

In an example embodiment, the plurality of sensor devices comprise two or more radar based sensors.

In an example embodiment, the edge sensor unit further comprises a power component configured for providing or obtaining power based on one or more different power supply sources.

In an example embodiment, the one or more different power supply sources comprise one or more of direct current (DC) input, alternating current (AC) input, solar input, regenerative energy capture input, and battery.

In an example embodiment, the one or more processing circuits are configured to control or manage one or both of operation of the plurality of sensor devices and handling of sensory data to support operating collaboratively with at least one other edge sensor unit in the communication network.

In an example embodiment, the one or more processing circuits are configured to support operating collaboratively with the at least one other edge sensor unit in the communication network using timing synchronization.

In an example embodiment, the one or more processing circuits are configured to operating collaboratively with at least one other edge sensor unit to enable combined object tracking with at least one other edge sensor unit.

In an example embodiment, the one or more processing circuits are configured to perform or support fusing of sensory data collaboratively with at the least one other edge sensor unit.

In an example embodiment, the one or more processing circuits are configured to perform or support the fusing of sensory data in real-time or near real-time.

In an example embodiment, the one or more processing circuits are configured to process at least some of the sensory data using advanced processing techniques.

In an example embodiment, the one or more processing circuits are configured to process at least some of the sensory data using artificial intelligence (AI) based processing.

An example sensor gateway node, in accordance with the present disclosure, may be configured for operating in a communication network comprising a plurality of network nodes, the sensor gateway node comprising: a point-to-point radio configured for facilitating and/or supporting point-to-point communication within the communication network; one or more processing circuits configured for one or both of controlling and processing of data; and a communication module comprising one or more communication circuits configured to facilitate or support one or both of local communication with one or more local devices that are not part of the communication network, and remote communication with one or more remote systems; and wherein the plurality of network nodes comprises one or more edge sensor units; wherein the sensor gateway node is configured to establish connections with the one or more edge sensor units; and wherein the one or more processing circuits are configured to process data obtained within the communication network, the processing comprising fusing sensory data obtained by the one or more edge sensor units.

In an example embodiment, the communication network comprises a mesh network.

In an example embodiment, the communication module comprises a point-to-point radio configured for communication within the communication network.

In an example embodiment, the communication module comprises a WiFi access point component configured to handle wireless local network access.

In an example embodiment, the communication module comprises a cellular radio component configured to handle communication via cellular based connections.

In an example embodiment, the cellular radio component comprises 4G/LTE radio and/or 5G radio.

In an example embodiment, the communication module comprises or is coupled to one or more antennas, and wherein the one or more communication circuits is configured to support or control communication via the one or more antennas.

In an example embodiment, the one or more antennas comprise at least one multiple-input and multiple-output (MIMO) antenna, and wherein the one or more communication circuits is configured to support or control communication via the MIMO antenna.

In an example embodiment, the one or more communication circuits are configured to set up and use local network based communication with the one or more local devices, using one or more local wired and/or wireless connections via the communication module.

In an example embodiment, the one or more communication circuits are configured to enable cloud based communication, with a cloud network, using one or more connections via the communication module.

In an example embodiment, the one or more communication circuits are configured to set up and use virtual private network (VPN) based communication with the cloud network.

In an example embodiment, the one or more communication circuits are configured to communicate data with at least one remote system via the cloud based routing.

In an example embodiment, the one or more communication circuits are configured to adaptively process data for communication to the one or more remote systems and the one or more local devices.

In an example embodiment, the one or more processing circuits are configured to process at least some of the data using advanced processing techniques.

In an example embodiment, the one or more processing circuits are configured to process at least some of the data using artificial intelligence (AI) based processing.

In an example embodiment, the sensor gateway node further comprises one or more positioning devices configured to obtain one or both of geo-positioning data and orientation data.

In an example embodiment, the one or more processing circuits are configured to utilize the geo-positioning data and orientation data in support of one or both of the fusing of sensory data, and determining positioning and/or orientation related adjustments or corrections. The adjustments or corrections may be made in real-time or near real-time.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While various spatial and directional terms, such as top, bottom, lower, mid, lateral, horizontal, vertical, front and the like may be used to describe embodiments, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the disclosed technology is not limited in its application to the details of construction and the arrangement of the components set forth in the description or illustrated in the drawings. The technology is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An edge sensor unit configured for operating in a communication network comprising a plurality of network nodes, the edge sensor unit comprising:

a plurality of sensor devices configured for obtaining sensory data, the plurality of sensor devices comprising at least one radar based sensor;

one or more processing circuits configured for one or both of controlling and processing of data; and a communication module comprising one or more communication circuits configured to facilitate or support local communication with one or more other nodes in the communication network;

wherein the edge sensor unit is configured to communicate with one or both of at least one other edge sensor unit or a sensor gateway node configured to provide connectivity to edge sensor units in the communication network;

wherein the one or more processing circuits are configured to perform or support fusing of sensory data obtained by the edge sensor unit and at least one other edge sensor unit in the communication network; and wherein the fusing of sensory data obtained by the edge sensor unit and the at least one other edge sensor unit in the communication network comprises synchronizing one or more portions of the sensory data obtained by the edge sensor unit with one or more portions of the sensory data obtained by the at least one other edge sensor unit.

2. The edge sensor unit according to claim 1, wherein the communication network comprises a mesh network.

3. The edge sensor unit according to claim 1, wherein the communication module comprises a point-to-point radio configured for communication within the communication network.

4. The edge sensor unit according to claim 1, wherein the communication module is configured to enable or support one or more of WiFi, cellular, and satellite based communication.

5. The edge sensor unit according to claim 1, wherein the communication module comprises or is coupled to one or more antennas, and wherein the one or more communication circuits is configured to support or control communication via the one or more antennas.

6. The edge sensor unit according to claim 5, wherein the one or more antennas comprise at least one multiple-input and multiple-output (MIMO) antenna, and wherein the one or more communication circuits is configured to support or control communication via the MIMO antenna.

7. The edge sensor unit according to claim 1, further comprising one or more positioning devices configured to obtain one or both of geo-positioning data and orientation data.

8. The edge sensor unit according to claim 7, wherein the one or more processing circuits are configured to determine, based on the geo-positioning data and orientation data, accurate location and heading related data for the edge sensor unit compensating for object detection locations.

9. The edge sensor unit according to claim 7, wherein the one or more processing circuits are configured to determine, based on the geo-positioning data and orientation data, compensating adjustments or corrections for object detection locations.

10. The edge sensor unit according to claim 1, wherein the plurality of sensor devices are configured to obtain sensory data corresponding to or based on at least two different types of sensing technologies.

11. The edge sensor unit according to claim 10, wherein the at least two different types of sensing technologies comprise optical sensing and radar sensing.

12. The edge sensor unit according to claim 1, wherein the plurality of sensor devices comprise two or more radar based sensors.

13. The edge sensor unit according to claim 1, further comprising a power component configured for providing or obtaining power based on one or more different power supply sources.

14. The edge sensor unit according to claim 13, the one or more different power supply sources comprise one or more of direct current (DC) input, alternating current (AC) input, solar input, regenerative energy capture input, and battery.

15. The edge sensor unit according to claim 1, wherein the one or more processing circuits are configured to control or manage one or both of operation of the plurality of sensor devices and handling of sensory data to support operating collaboratively with at least one other edge sensor unit in the communication network.

16. The edge sensor unit according to claim 15, wherein the one or more processing circuits are configured to support operating collaboratively with the at least one other edge sensor unit in the communication network using timing synchronization.

17. The edge sensor unit according to claim 15, wherein the one or more processing circuits are configured to operating collaboratively with at least one other edge sensor unit to enable combined object tracking with at least one other edge sensor unit.

18. The edge sensor unit according to claim 15, wherein the one or more processing circuits are configured to perform or support fusing of sensory data collaboratively with at the least one other edge sensor unit.

19. The edge sensor unit according to claim 1, wherein the one or more processing circuits are configured to perform or support the fusing of sensory data in real-time or near real-time.

20. The edge sensor unit according to claim 1, wherein the one or more processing circuits are configured to process at least some of the sensory data using artificial intelligence (AI) based processing.

21. A sensor gateway node configured for operating in a communication network comprising a plurality of network nodes, the sensor gateway node comprising:

a point-to-point radio configured for facilitating and/or supporting point-to-point communication within the communication network;

one or more processing circuits configured for one or both of controlling and processing of data; and a communication module comprising one or more communication circuits configured to facilitate or support one or both of local communication with one or more local devices that are not part of the communication network, and remote communication with one or more remote systems;

wherein the plurality of network nodes comprises one or more edge sensor units, at least one of the one or more edge sensor units comprising a plurality of sensor devices including at least one radar based sensor;

wherein the sensor gateway node is configured to establish connections with the one or more edge sensor units;

wherein the one or more processing circuits are configured to process data obtained within the communication network, the processing comprising fusing sensory data obtained by the one or more edge sensor units; and wherein the fusing of sensory data obtained by the one or more edge sensor units comprises synchronizing at least a first portion of the sensory data obtained by the one or more edge sensor units with at least a second portion of the sensory data obtained by the one or more edge sensor units.

22. The sensor gateway node according to claim 21, wherein the communication network comprises a mesh network.

23. The sensor gateway node according to claim 21, wherein the communication module comprises a point-to-point radio configured for communication within the communication network.

24. The sensor gateway node according to claim 21, wherein the communication module comprises a WiFi access point component configured to handle wireless local network access.

25. The sensor gateway node according to claim 21, wherein the communication module comprises a cellular radio component configured to handle communication via cellular based connections.

26. The sensor gateway node according to claim 25, wherein the cellular radio component comprises 4G/LTE radio and/or 5G radio.

27. The sensor gateway node according to claim 21, wherein the communication module comprises or is coupled to one or more antennas, and wherein the one or more communication circuits is configured to support or control communication via the one or more antennas.

28. The sensor gateway node according to claim 27, wherein the one or more antennas comprise at least one multiple-input and multiple-output (MIMO) antenna, and wherein the one or more communication circuits is configured to support or control communication via the MIMO antenna.

29. The sensor gateway node according to claim 21, wherein the one or more communication circuits are configured to set up and use local network based communication with the one or more local devices, using one or more local wired and/or wireless connections via the communication module.

30. The sensor gateway node according to claim 21, wherein the one or more communication circuits are configured to enable cloud based communication, with a cloud network, using one or more connections via the communication module.

31. The sensor gateway node according to claim 30, wherein the one or more communication circuits are configured to set up and use virtual private network (VPN) based communication with the cloud network.

32. The sensor gateway node according to claim 30, wherein the one or more communication circuits are configured to communicate data with at least one remote system via the cloud based routing.

33. The sensor gateway node according to claim 30, wherein the one or more communication circuits are configured to adaptively process data for communication to the one or more remote systems and the one or more local devices.

34. The sensor gateway node according to claim 21, wherein the one or more processing circuits are configured to process at least some of the data using artificial intelligence (AI) based processing.

35. The sensor gateway node according to claim 21, further comprising one or more positioning devices configured to obtain one or both of geo-positioning data and orientation data.

36. The sensor gateway node according to claim 35, wherein the one or more processing circuits are configured to utilize the geo-positioning data and orientation data in support of one or both of the fusing of sensory data, and determining positioning and/or orientation related adjustments or corrections.

* * * * *